United States Patent
Tuomela et al.

(10) Patent No.: US 6,792,287 B1
(45) Date of Patent: Sep. 14, 2004

(54) ELECTRONIC APPARATUS

(75) Inventors: Urpo Tuomela, Ii (FI); Pertti Huuskonen, Oulu (FI)

(73) Assignee: Nokia Mobile Phone Limited, Espoo (FI)

(*) Notice: Subject to any disclaimer, the term of this patent is extended or adjusted under 35 U.S.C. 154(b) by 0 days.

(21) Appl. No.: 09/345,894

(22) Filed: Jul. 1, 1999

(30) Foreign Application Priority Data

Jul. 2, 1998 (GB) ............................................. 9814398

(51) Int. Cl.[7] ................................................ H04Q 7/32
(52) U.S. Cl. ................... 455/556.1; 455/564; 455/565; 340/5.83; 345/173; 379/355; 382/115; 382/124
(58) Field of Search ................................. 455/461, 411, 455/73, 550.1, 556.1, 556.2, 564, 565; 340/5.83; 345/173; 379/355; 382/115, 124

(56) References Cited

U.S. PATENT DOCUMENTS

| | | | | |
|---|---|---|---|---|
| 5,267,308 A | * | 11/1993 | Jokinen et al. | 379/354 |
| 5,684,873 A | * | 11/1997 | Tiilikainen | 379/354 |
| 5,710,810 A | * | 1/1998 | Tiilikainen | 379/355 |
| 5,825,352 A | * | 10/1998 | Bisset et al. | 345/173 |
| 5,887,264 A | * | 3/1999 | Kohler | 455/461 |
| 5,920,642 A | * | 7/1999 | Merjanian | 340/5.83 |
| 5,933,515 A | * | 8/1999 | Pu et al. | 382/115 |
| 6,088,585 A | * | 7/2000 | Schmitt et al. | 455/411 |
| 6,141,436 A | * | 10/2000 | Srey et al. | 382/124 |
| 6,603,462 B2 | * | 8/2003 | Matusis | 345/173 |

FOREIGN PATENT DOCUMENTS

| | | | |
|---|---|---|---|
| DE | 297 22 222 UI | * | 8/1998 |
| GB | 2 148 569 A | * | 5/1985 |
| GB | 2 315 954 A | * | 2/1998 |
| JP | 5 103068 | * | 4/1993 |
| JP | 5 344217 | * | 12/1993 |
| JP | 8 289004 | * | 11/1996 |
| WO | WO 98/11750 | * | 3/1998 |

OTHER PUBLICATIONS

United Kingdom Search Report.*
"User Authentication in Mobile Telecommunication Environments Using Voice Biometrics and Smartcards", Lapere M. et al., 1997, pp. 437–443.

* cited by examiner

Primary Examiner—Lester G. Kincaid
(74) Attorney, Agent, or Firm—Perman & Green, LLP

(57) ABSTRACT

A fingerprint recognition system intended primarily, but not exclusively, for mobile phones in which a fingerprint recognition system recognizes the separate fingers and thumbs of a user and determines a function of the phone which has been previously associated with that recognized finger/thumb of the user. The determined function is then carried out by the phone. The automatic dialling of a predefined telephone number may be associated with each finger/thumb of the user, or other functions such as the selected ring tone may be associates with certain fingers/thumbs. A particular finger/thumb may have different functions associated with it depending the mode of operation of the phone.

11 Claims, 3 Drawing Sheets

ELECTRONIC APPARATUS

FIELD OF THE INVENTION

The present invention relates to electronic apparatus and in particular, but not exclusively to mobile telephones.

BACKGROUND OF THE INVENTION

Fingerprint recognition systems are well known and are made by a number of different companies including Siemens. These known fingerprint recognition systems allow the fingerprint of a user to be stored and subsequently recognised. The current applications of these fingerprint recognition systems are for security purposes. For example, unauthorised access to electronic apparatus such as mobile telephones and computers can be prevented. In the case of mobile telephones, unauthorised users are prevented from making telephone calls. However, no consideration has been given to applications of fingerprint recognition systems other than for security.

Mobile telephones are, of course, well known and frequently include a speed dial function. In order to make a call, the user normally has to enter the telephone number to the party to be called using a keypad. With a speed dial function, the user prestores a frequently used number. That stored number is then associated with a single one of the keys, usually one of the number keys. The stored number can then be dialled by activating only one or two keys. For example the stored number can be dialled by activating a speed dial key and the key associated with the stored number. Alternatively, the key associated with the stored number can be activated for a predetermined time order to dial the stored number. However, where a user has a different number associated with each of the keys, it can be difficult for a user to remember which number is associated with which key.

SUMMARY OF THE INVENTION

According to one aspect of the present invention, there is provided electronic apparatus arranged to carry out a plurality of functions, said apparatus comprising: fingerprint recognition means arranged to recognise at least two different fingerprints of a user; means for determining a function associated with a recognised fingerprint, each of said at least two recognised fingerprints of said user being associated with a different function; and means for carrying out said determined function.

One advantage of associating a given function with a given finger is that it makes it easier for the blind and visually impaired to use the apparatus. This a particular advantage if the apparatus has a keypad and a number of keystrokes would be required in order to achieve a given function. The association of a given functions with a given finger is unique to the user, fast and can be easier to remember than, for example a number. People have the tendency to associate non-physical information with physical objects. Embodiments of the present invention take advantage of this tendency. For example, the ring finger of a user could be associated with a function relating to a spouse of the user.

Storage means may be provided for storing the information associating the at least one fingerprint and the associated function, the determining means being arranged to retrieve said information from the storage means. Typically, the storage means will comprise a memory of the apparatus.

Alternatively, communication means are provided to allow the determining means to obtain information from a remote storage location associating the at least one fingerprint and the associated function. The communication means may comprise wireless communication means or a wired connection. If the apparatus is a mobile phone, the remote storage location may be in a base station or a mobile station controller.

Preferably, the fingerprint recognition means is arranged to recognise at least two different fingerprints of a user and different functions are associated with different fingerprints.

The apparatus may be operable to carry out said functions only if said at least one fingerprint is recognised by said fingerprint recognition means. Thus the security applications of fingerprint recognition can also be used in embodiments of the present invention.

Preferably, the apparatus is portable.

The apparatus may comprise telecommunication apparatus. The telecommunication apparatus may comprise a telephone, a facsimile machine or the like. Preferably, the telephone is a mobile telephone. However, the telephone may alternatively be a wired telephone. Preferably, the function associated with a fingerprint of a user is a speed dial function. Of course other functions may be associated with at least one fingerprint. The functions are preferably control functions.

Preferably, dependent on the mode of operation of the electronic apparatus different functions are associated with a recognised fingerprint.

For a better understanding of the present invention and as to how the same may be carried into effect, reference will now be made by way of example to the accompanying drawings in which:

DETAILED DESCRIPTION OF THE PREFERRED EMBODIMENTS

It will be appreciated that throughout this specification references to the fingers of a user include the thumbs and that similarly a fingerprint is understood to refer to either a fingerprint or thumbprint.

Figure 1:
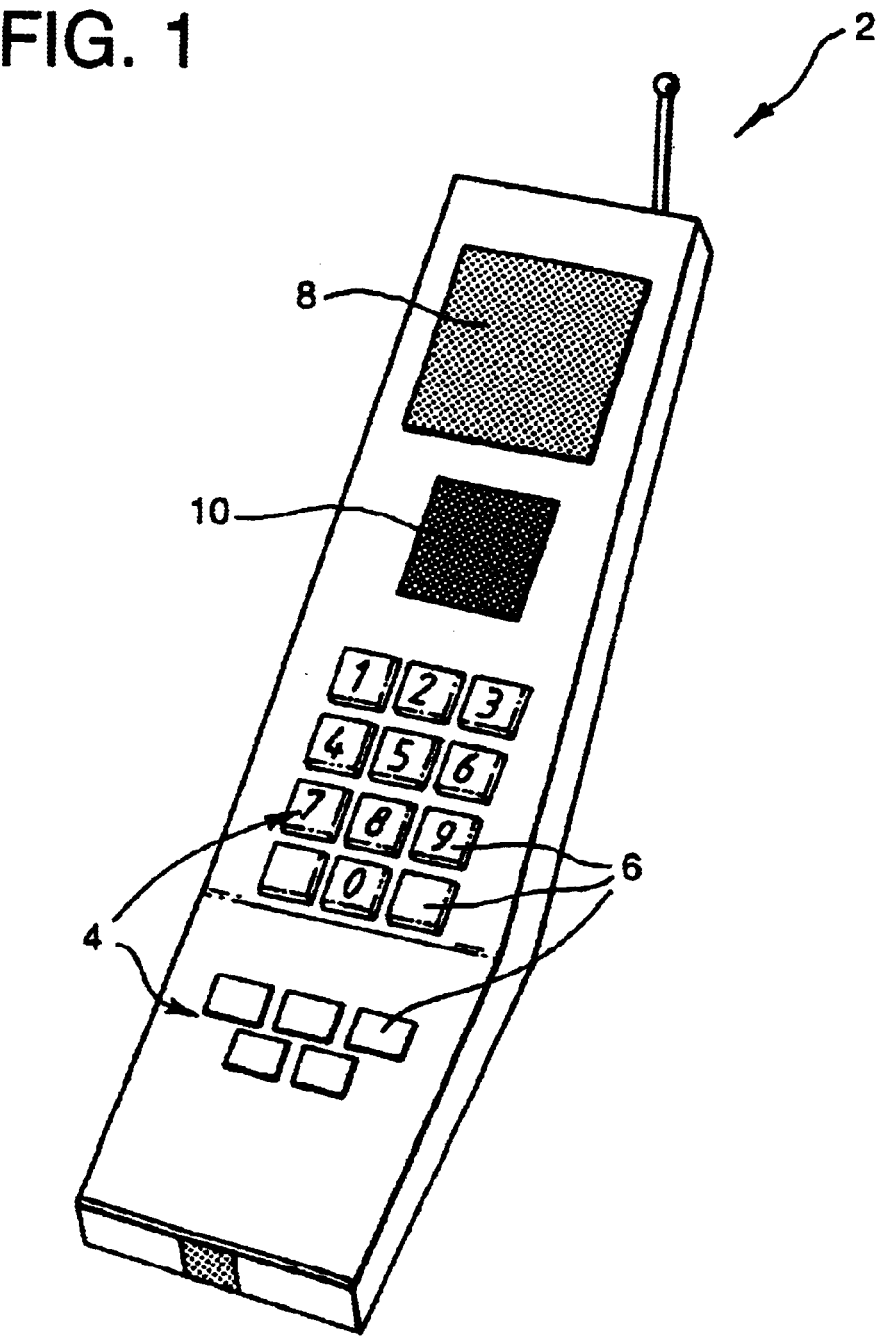
FIG. 1 shows a schematic view of a mobile telephone embodying the present invention.

Reference will first be made to FIG. 1 which shows a mobile telephone 2 embodying the present invention. The mobile phone 2 has a keypad 4 which comprises a plurality of keys 6 actuatable by a user. The keys 6 include number keys and also control keys, as is well known in the art. The mobile phone 2 also includes a display 8 which displays information for the user. This information may include the number dialled by the user. The mobile phone 2 includes a sensor plate 10 for a fingerprint recognition system. The sensor plate 10 is arranged between the keypad 4 and the display 8. The sensor plate is sized so as to allow the user to place a finger or thumb thereon.

Figure 2:
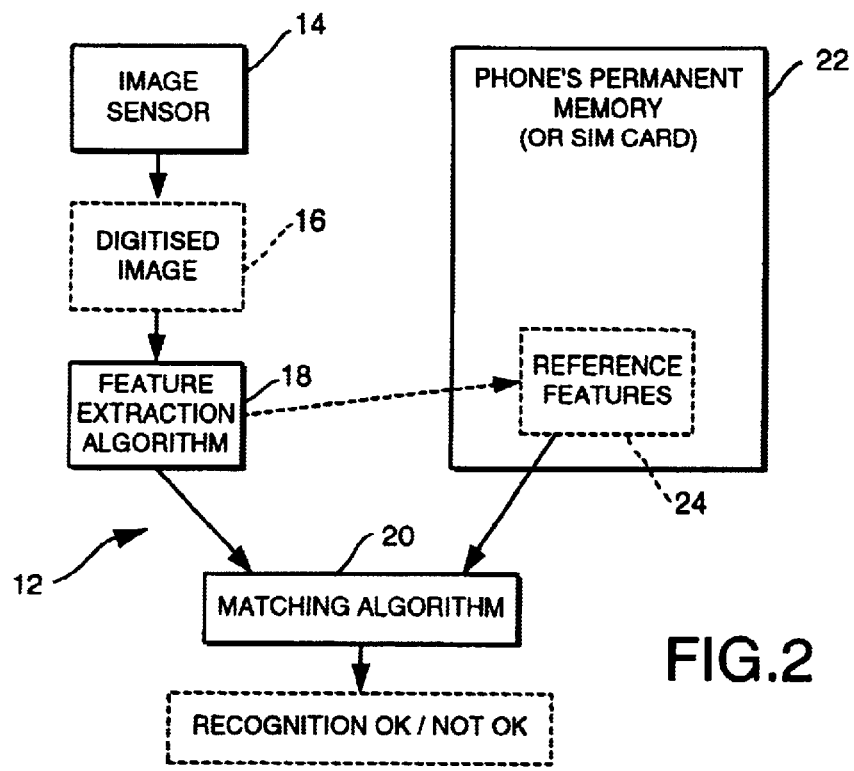
FIG. 2 shows a block diagram of a fingerprint recognition system incorporated in the mobile telephone of FIG. 1.

Reference will now be made to FIG. 2 which shows a block diagram of a fingerprint recognition system 12 incorporated in the mobile telephone 2 of FIG. 1. The fingerprint system 12 is incorporated inside the mobile phone 2 and comprises an image sensor 14. The image sensor 14 is arranged below the sensor plate 10. When a finger is put on the plate 10, the image of the finger is scanned by the image sensor 14. The image sensor 14 provides an analogue output which is converted by convertor 16 to provide a digitised image. The image sensor can alternatively provide directly a digitised image. The digitised image is input to a first processor 18 which carries out an feature extraction algorithm in respect of the input image. In particular, the feature extraction algorithm allows the key features of the fingerprint to be extracted. The extracted finger features are output by the first processor 18 to a second processor 20. It should be appreciated that the first and second processors 18 and 20 may be in practice implemented by a single processor.

The first processor 18 also generates a control signal which is sent to a memory 22. This memory 22 is the mobile phone's permanent memory or alternatively may be on a SIM (Subscriber Identity Module) card which includes a memory. The memory 22 has a portion 24 which stores key features of a user's fingerprints. As will be described hereinafter, the memory portion preferably stores key features of more than one fingerprint of a user. It should be noted that the memory portion 24 may store the key features of fingerprints for more than one user. In response to control signal from the first processor 18, the contents of the memory portion 24 are output to the second processor 20. The contents of the memory portion 24 may be output at the same time to the second processor 20 or alternatively may be output fingerprint by fingerprint to the second processor 20 until a match is detected, as described hereinafter.

The second processor 20 is arranged to compare the output of the first processor 18 with the key features of the fingerprints which are stored in the memory portion 24. The second processor thus performs a matching algorithm. The second processor 20 provides an output identifying if there has been a match, and if so which finger has been identified. If the second processor 20 finds no match, a signal indicating this is output. If no match is identified, a message to this effect may be displayed on the display 8.

Figure 3:
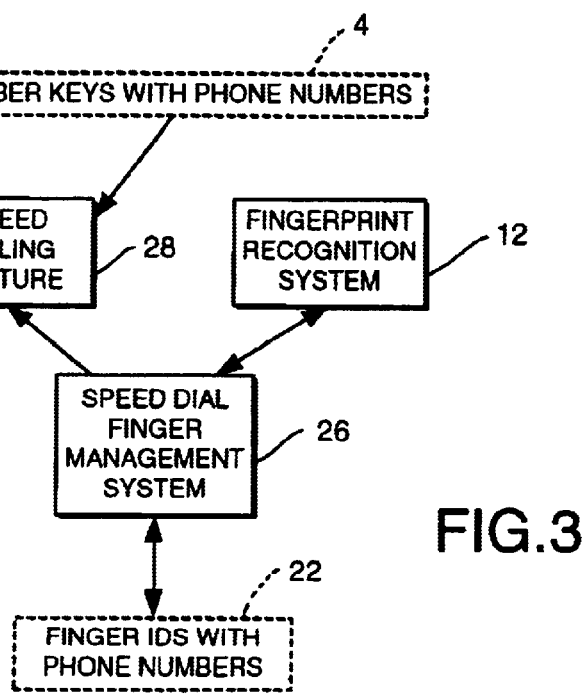
FIG. 3 shows a block diagram of the main system of the mobile telephone of FIG. 1.

Reference will now be made to FIG. 3 which shows a block diagram of the main system of the mobile station 2. As can be seen, the main system includes the fingerprint recognition system 12 shown in FIG. 2. The output of the fingerprint recognition system 12 is provided by the second processor 20 and is provided to the speed dial management system 26. The speed dial management system is connected to a memory which preferably forms part of the memory 22 shown in FIG. 2. The information provided by the fingerprint recognition system 12 allows the speed dial management system 26 to identify which fingerprint of which user has been placed on the sensor plate 10. The speed dial management system 26 retrieves from the memory 22 the number associated with the identified fingerprint. This information is output to the speed dial controller 28. The speed dial management system 26 is preferably a processor and may form part of the same processor as the first and second processors 18 and 20.

The speed dial controller 28 is arranged to dial the identified number. The speed dial controller 28 is arranged also to be connected to the keypad 4 so that a speed dial function can also be achieved using the keypad 4. The information from the keypad 4 may first be processed to firstly identify that a speed dial function is to be performed and secondly to retrieve the telephone number associated with the actuated key before being passed to the speed dial controller 28. The telephone number of the keypad activated speed dial is preferably stored and retrieved from the memory 22.

The speed dial controller 28 again may be a processor and, if so may be included in a common processor with the first and second processors 18 and 20 and the speed dial management system 26.

Figure 4:
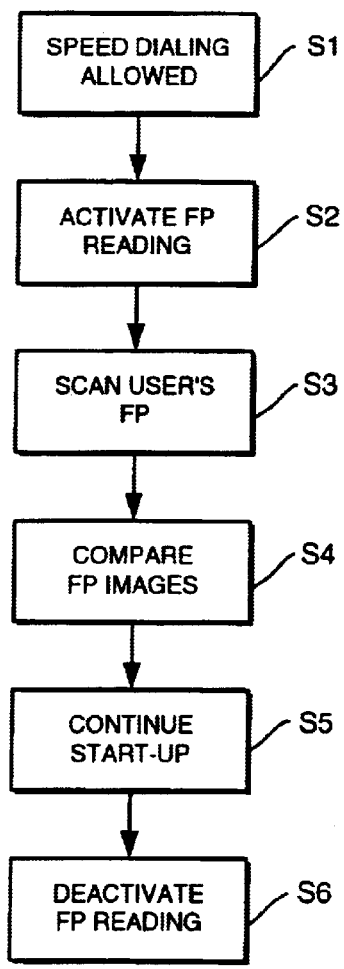
FIG. 4 is a flow chart of the steps carried out to achieve speed dialling.

Reference will now be made to FIG. 4 which shows a flow chart of the steps carried out to achieve speed dialling. In step S1, the user inputs an indication that speed dialling is to take place. This indication can take any suitable form. For example, a speed dial key may be provided on the keyboard 4 which is activated by a user if the speed dial function is required. The user then in step S2 places the finger corresponding to the number to be speed dialled on the sensor plate 10 and the fingerprint recognition system 12 is activated.

In step S3, the user's fingerprint is scanned by the sensor 14, converted by the analogue to digital convertor 16 to digital form and output to the first processor 18. In step S4, the key features are extracted by the first processor 18 and output to the second processor 20. The key features of the fingerprint are identified by the first processor 18 are compared by the second processor 20 with those stored in the memory portion 24.

In step S5, if the fingerprint has been successful identified by the second processor 20, the speed dial management system 26 checks if there is any number associated with the identified fingerprint. If so, the speed dial management system 26 obtains from the memory 22 the number associated with the identified fingerprint. The number is then passed to the speed dial controller 28 which dials the number. In step S6, the fingerprint recognition system 12 is deactivated until the next time that it is required.

Figure 5:
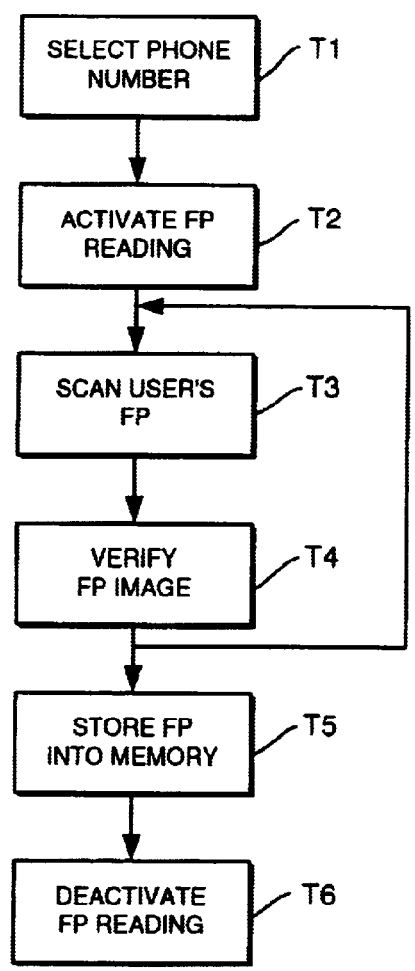
FIG. 5 is a flow chart of the steps carried out to assign different numbers to different fingerprints.

Reference will now be made to FIG. 5 which shows a flow chart of the steps carried out to assign different fingerprints to different numbers. In the first step, T1, the user selects a phone number. This can be selected by accessing a number previously stored in a memory or a number entered by the user via the keypad 4. The user then activates a key of the keypad 4 which initiates a fingerprint assigning mode of operation. Alternatively, the user could select an option available via a menu displayed on the display to initiate this mode of operation.

In step T2, the image sensor 14 of the fingerprint recognition system 12 is activated. In step T3, the image sensor 10 scans the fingerprint of the user, to be associated with the number selected in the first step T1, when the finger of the user is placed on the sensor plate 10. In the next step, step T4, a message is displayed on the display 8 requesting the user to place his finger on the sensor plate 10 so that the image scanned in step T3 can be verified. The image sensor 14 thus scans the same fingerprint again.

If the verification is successful, the scanned fingerprint image is, in step T5, stored in the memory portion 22 along with information identifying the associated telephone number. The fingerprint recognition unit 12 is then deactivated in step T6. If the verification step T4 is not successful, then steps T3 and T4 are then repeated. An optional step is then to test that the correct speed dial function has been associated with the given finger of a user. This test step will typically involve a test call or the dialling of the number in response to the user placing the finger associated with the number on the sensor plate 10.

In the above described embodiment, the fingerprint recognition system 12 is used to provide a speed dial function.

However in preferred embodiments, the fingerprint recognition system is also used as a security measure. Thus in order for the user to be able to make a telephone call and/or to access information stored in a memory of the phone, a fingerprint of a user must be identified. Thus the output of the second processor 20 is monitored. If a signal indicative of a match is output, then the user is able to dial a number and/or access information stored in the memory thereof. If, on the other hand, the second processor 20 outputs a signal indicative that there is no match, then the user is unable to make any calls and/or access information stored in the memory.

In the above described embodiment, different numbers are assigned to different fingers of a user. It also possible that other functions, other than a speed dial function could be achieved with embodiments of the present invention. For example in the context of a mobile phone, the function assigned to a given finger could be to automatically cause voice messages to be retrieved or other messages to be displayed. Other possible functions which could be achieved on the recognition of a particular fingerprint of a user include: answer telephone; not to answer telephone on receipt of a call; initiate a call; end a call; find a name; store a caller's number; record a call; go to a particular menu or menu option; answer a call with a given prerecorded message; change ringing tone; adjust ringing tone level; and lock or unlock a keypad. As a further example, depending on the mode of operation of a mobile phone different functions may be associated with a recognised finger. Hence, for example, when the phone is switched on but not in use the function associated with a particular finger may be to change the ringing tone, whereas when the phone is actually in use, the function associated with that particular finger may be to increase the speaker volume.

As is clear, in the first example the user will be limited to a maximum of 10 functions which can be selected by using different fingers, unless of course some type of shift function is provided. However, in the second example for each mode of operation of the apparatus the user will be limited to a maximum of 10 functions.

A user may wish to have different phone settings for different conditions. These settings include ringer on/off, ringer volume, speech volume and the like. For example, the user may wish to have the ringer off when he is in a meeting. If the user is outdoors, a higher ringer volume and speech volume would be required whereas if the user is in a building a lower ringer volume and speech volume would be required. Thus different fingerprints may be used to select one of these three conditions.

Another possibility would be to use two fingers to adjust the level of operation. In general the operation level can be made faster/slower, higher/lower, or on/off. For example one finger could be used to increase the speech volume or the ringing tone volume whilst another finger would be used to reduce the volume. Another example is that one finger could be used to scroll down a menu whilst another finger is used to scroll up the menu. One finger could be used to switch on, for example a display back light, a ringer or the like whilst a different finger may be used for switching off. It is also possible that a single finger can be used to switch on and off the same device. Each application of the given finger to the sensor plate will cause the state of, for example the light to be altered.

In one modification to the present invention, different users may be able to use the same telephone. Each user would have their own user profile. For example, with a mobile telephone belonging to a family, the parents may wish to prevent their children making certain types of calls. The user profile would be associated with one or more fingerprints of each user. Thus when a user places a finger on the sensor plate 10, the user would be identified by his fingerprint and the telephone 2 would be arranged to operate in accordance with the identified user's profile.

In the above described embodiment, the identification of the fingerprints and the setting of the function associated therewith take place in the mobile telephone. However in alternative embodiments of the present invention, the mobile station could send the fingerprint information to a remote controller which identifies the fingerprint and any function associated therewith. Information on the function is then sent back to the mobile telephone. This modification has the advantage that a user can use any suitable mobile phone and as the user is identified by his fingerprints, the user can be billed for any calls which he makes. In other words, billing would be associated witch the user and not with a particular telephone. Additionally, the user would not have to reprogram his mobile telephone each time he changed his telephone.

The function associated with a given fingerprint may alter operation of the network instead of or as well as altering the operation of the mobile telephone.

In the embodiment described hereinbefore, the assigning of a given fingerprint takes place in the mobile phone. In an alternative embodiment this process may involve the use of a PC. The computer would include a fingerprint sensor along with associated software. Each finger of a user would be scanned twice. The second scan is for verification purpose. Various functions would be assigned to the different fingers of a user. This information, that is the fingerprint information and the associated functions, would then be transferred to the mobile phone using any suitable connection. The mobile phone may then perform a test to ensure that the correct functions have been assigned to the various fingers of a user.

In preferred embodiments of the invention, the user is able to select which functions he wishes to associate with different fingers. It is preferred that the user be able to select the finger which is to be associated with a given function.

It should be appreciated that any commercially available fingerprint recognition system can be incorporated in embodiments of the present invention. The size of the recognition systems may be influential in the choice thereof. The available fingerprint recognition systems tend to use either optical or capacitive sensors. Companies which supply such recognition systems include Siemens, Verdicom, Cross Check Corporation, Identix Corporation and Identicator Corporation.

In some mobile phones, a infra red link is provided. It is therefore possible that the mobile phone could also be used to control other devices. As with the embodiment described hereinbefore, different remote control functions can be associated with different fingers.

Whilst the present invention has been described in the context of a mobile telephone, it should be appreciated that the present invention can be incorporated in any other suitable electronic apparatus. The electronic apparatus may, but not necessarily be portable. The present invention may be incorporated in any of the following devices: computers; lap top computers; electronic note books; facsimile machines; remote controls; wired telephones; calculators; cameras; televisions; audio apparatus such as CD players, tape players and record players; radios; video apparatus; domestic appliances such as washing machines and ovens; and light switches.

It should be appreciated that the above list is not exhaustive but is merely by way of example. All of the above mentioned apparatus have the property that a plurality of different functions can be performed thereby. In implementation of the present invention, different functions can be associated with different fingers. For example, in the case of a television, different fingers could be associated with different television channels.

What is claimed is:

1. Electronic apparatus arranged to carry out a plurality of functions, said apparatus comprising:
    fingerprint recognition means arranged to recognise at least two different fingerprints of a user;
    determining means for determining a function associated with a recognised fingerprint, each of said at least two recognised fingerprints of said user being associated with a different function; and
    means for carrying out said determined function.

2. Apparatus as claimed in claim 1, wherein storage means are provided for storing the information associating the recognised fingerprint and the associated function, the determining means being arranged to retrieve said information from the storage means.

3. Apparatus as claimed in claim 1, wherein communication means are provided to allow the determining means to obtain information from a remote storage location associating the recognised fingerprint and the associated function.

4. Apparatus as claimed in claim 3, wherein the communication means comprises wireless communication means.

5. Apparatus as claimed in claim 1, wherein said apparatus is operable to carry out said functions only if said at least one fingerprint is recognised by said fingerprint recognition means.

6. Apparatus as claimed in claim 1, wherein said apparatus is portable.

7. Apparatus as claimed in claim 1, wherein said apparatus comprises telecommunication apparatus.

8. Apparatus as claimed in claim 7, wherein said telecommunication apparatus comprises a telephone.

9. Apparatus as claimed in claim 8, wherein the telephone is a mobile telephone.

10. Apparatus as claimed in claim 9, wherein said function associated with a fingerprint of a user is a speed dial function.

11. Apparatus as claimed in claim 1, wherein dependent on the mode of operation of the electronic apparatus different functions are associated with a recognised fingerprint.

* * * * *